United States Patent
Pirhonen et al.

(10) Patent No.: US 11,560,021 B2
(45) Date of Patent: Jan. 24, 2023

(54) STUD OF A TIRE

(71) Applicant: Nokian Renkaat Oyj, Nokia (FI)

(72) Inventors: Juha Pirhonen, Sarkola (FI); Mikko Liukkula, Viiala (FI); Tommi Ajoviita, Kangasala (FI)

(73) Assignee: Nokian Renkaat Oyj, Nokia (FI)

( * ) Notice: Subject to any disclaimer, the term of this patent is extended or adjusted under 35 U.S.C. 154(b) by 508 days.

(21) Appl. No.: 16/728,574

(22) Filed: Dec. 27, 2019

(65) Prior Publication Data

US 2020/0223262 A1  Jul. 16, 2020

(30) Foreign Application Priority Data

Jan. 16, 2019  (FI) ..................................... 20195027

(51) Int. Cl.
B60C 11/16  (2006.01)

(52) U.S. Cl.
CPC ...... B60C 11/1675 (2013.01); B60C 11/1643 (2013.01); B60C 11/1693 (2013.01)

(58) Field of Classification Search
CPC ............. B60C 11/1675; B60C 11/1643; B60C 11/1693
See application file for complete search history.

(56) References Cited

U.S. PATENT DOCUMENTS

| | | | | |
|---|---|---|---|---|
| 3,593,771 A * | 7/1971 | Carlstedt | ................ | B60C 11/16 152/210 |
| 2004/0163746 A1* | 8/2004 | Eromaki | ................ | B29D 30/66 156/114 |
| 2017/0203615 A1 | 7/2017 | Matsumoto | | |

FOREIGN PATENT DOCUMENTS

| | | |
|---|---|---|
| CN | 101100159 A | 1/2008 |
| DE | 1903668 A1 * | 8/1970 |
| EP | 1642753 B1 | 6/2012 |
| EP | 2933121 A1 | 10/2015 |
| EP | 3025880 A1 | 6/2016 |
| FI | 861/64 A * | 4/1970 |
| FI | 123752 B | 10/2013 |
| FI | 125983 B | 5/2016 |
| GB | 1063936 | 4/1967 |
| GB | 1198787 | 2/1969 |
| GB | 1269520 | 4/1972 |
| GB | 1469706 | 4/1977 |
| RU | 2148498 C1 | 5/2000 |
| RU | 2280564 | 7/2006 |
| RU | 2292269 C2 * | 1/2007 |

OTHER PUBLICATIONS

Machine translation for Finland 861/64 (Year: 2022).*
Machine translation for Russia 2,292,269 (Year: 2022).*
Machine translation for German 1,903,668 (Year: 2022).*

* cited by examiner

*Primary Examiner* — Steven D Maki
(74) *Attorney, Agent, or Firm* — Merchant & Gould P.C.

(57) ABSTRACT

Disclosed is a tire stud comprising a stainless steel body with a flange and a blind hole and further comprising a spike installed in said hole, wherein the cross-sectional shape of the hole is different from the cross-sectional shape of the spike at least at one of: the opening, the lower surface of the spike, and a depth between the opening lower surface of the spike; whereby only protrusions of the spike are attached to the side wall of the hole with friction joints where the cross-sectional shape of the hole is different from the cross-sectional shape of the spike.

8 Claims, 14 Drawing Sheets

F-F

G-G

H-H

J-J

A-A

A-A

A-A

K-K

L-L

STUD OF A TIRE

PRIORITY

This application claims priority of Finnish national patent application number 20195027 which was filed on Jan. 16, 2019 and the contents of which is incorporated herein by reference.

FIELD

The solution relates to studded tires, and particularly studs used in studded tires.

BACKGROUND

As is known, studs may be used in tires to improve traction during e.g. winter conditions such as driving on an icy road.

And, as is known, such studs typically comprise a body with a blind hole, into which hole is inserted a spike which remains somewhat protruded from the stud body. Such a spike, then, is that element of the stud which contributes most to the traction provided by the stud.

Commonly, stud bodies are made of steel. This is problematic as steel corrodes, i.e. rusts, during both using tires having steel-bodied studs and during storage of such tires, such as during the summer season when studded tires are not in use but are in storage. Such a problem is made even more pronounced by a practice of applying salt on icy or snowy roads in some countries, whereby corrosion of steel-bodied studs is accelerated when used on salted roads. While such a problem often is attempted to be alleviated by zinc coating of steel studs, such a coating usually wears off very rapidly during use, leaving the studs prone to corrosion.

Corrosion of stud bodies is undesirable both with respect to the mechanical properties of the stud bodies as well as their visual appearance. For example, prolonged corrosion within the hole housing the spike may result in the spike becoming loose and, eventually, coming off from the body. Similarly, corrosion of the outer surface of the stud body increases the risk of the stud coming off from its installation cavity in the tire.

Therefore, there is a need to provide a solution to decrease or preferably prevent corrosion of stud bodies without adversely affecting the other properties of modern-day studs.

SUMMARY OF THE DISCLOSED SOLUTION

The disclosed solution is premised on a stainless-steel stud body, i.e. the body of a stud being made of stainless steel.

However, it is not possible to simply replace steel with stainless steel in a stud body and simultaneously retain all the other properties of modern-day studs. This is first and foremost because stainless steel is harder than steel and has a greater flow stress.

As background, when a stud is manufactured, a spike is inserted into a blind hole in a stud body, whereby fiction joint is formed between the side wall of the spike and the side wall of the blind hole into which the spike is inserted. Hence, the spike is held in place in the blind hole with the friction joint. Typically, the cross-sectional shape and area of the spike correspond to those of the blind hole at every height of the hole, i.e. over the entire hole-installed depth of the spike, so that the friction joint is formed at every height substantially over the entire circumference of the spike. Thereby, the spike is held firmly within the blind hole.

When the spike is housed within the blind hole in its installed position, typically there remains a gap between the lower surface of a spike and the floor of the blind hole in the body of the stud housing the spike. This is, for example, to enable the spike to withstand impacts by allowing the spike to nudge upon a great impact onto the spike towards the floor, thereby reducing the risk of spike damage or breakage.

However, as stainless steel is harder and has a higher flow stress than steel, mere replacement of steel with stainless steel in a stud body would result in greatly reduced possibility for the spike to nudge towards the floor of the blind hole, thereby resulting in increased risk of spike damage or breakage.

To enable using of stainless steel body with corrosion resistance and to retain the possibility for the spike to nudge within the blind hole of the body for low risk of spike damage or breakage, according to the disclosed solution, the cross-sectional shape of the hole may be different from the cross-sectional shape of the spike at least at one of: the opening, the lower surface of the spike, and a depth between the opening and the lower surface of the spike; whereby only protrusions of the spike may be attached to the side wall of the hole with friction joints where the cross-sectional shape of the hole is different from the cross-sectional shape of the spike.

For example, at the opening, the cross-sectional shape of the opening may be substantially similar to the cross-sectional shape of the spike at the opening, whereby the spike may be attached to the side wall of the hole at the opening with a friction joint over substantially the entire circumference of the spike; and thereafter towards the floor, the cross-sectional shape of the hole may be different from the cross-sectional shape of the spike at least at the lower surface of the spike, whereby only protrusions of the spike may be attached to the side wall of the hole with friction joints at least at the lower surface of the spike.

Thereby, the sum of the attaching force between the spike and the stud body may be reduced in order to advantageously compensate for the greater hardness and flow stress of stainless steel in the stud body so as to enable the spike to nudge within its installation hole upon a great impact while using a stainless steel stud body.

According to the disclosed solution, such difference in the cross-sectional shapes of the spike and its installation hole may be over the entire installation depth of the spike within the hole or over a part of said installation depth, for example at and/or near the lower surface of the spike.

As background for another obtainable benefit, the blind hole for the spike is commonly made in the body with a punch. In the case of stainless steel, i.e. the body being made of stainless steel, such a punch is subject to significantly greater forces than would be in the conventional case of the body being made of steel. This is because stainless steel has higher hardness and flow stress than steel, whereby stainless steel is less malleable than steel. Especially in the case of cold forging—a common method for manufacturing stud bodies including blind holes for spikes—the greater hardness and flow stress of stainless steel, in comparison to steel, subjects tools such as the punch to greater forces. As a result, a punch with a complex tip geometry is in great risk of damage or breakage when used, especially repetitively in serial production, to punch holes in stud bodies for spikes. A complex tip geometry for the punch may entail departure from a maximum tip surface area obtainable with a round punch tip, for example in the form of inward recess(es).

This, in turn, results in smaller cross-sectional area at and near the tip of the punch, and consequently weaker punch more prone to breakage and damage when used to punch holes in stainless steel bodies for studs.

To reduce the risk of breakage of the punch in the case of a corrosion-resistance stainless steel body while enabling the use of complex, e.g. non-circular, cross-sectional geometry in the spike, the disclosed solution may be employed such that the blind hole has a different cross-sectional shape at the floor in comparison to the cross-sectional shape of the opening of the hole. For example, the floor of the hole may be circular, hexagonal or octagonal even if the opening of the hole was different, for example more complex, in cross section from the floor. And, with respect to the installation of the spike into the hole, the cross-sectional shape of the hole at the lower surface of the spike may correspond to that of the floor, as the lower surface or the spike typically resides in the installed position at or preferably near the floor.

Figure 1A:
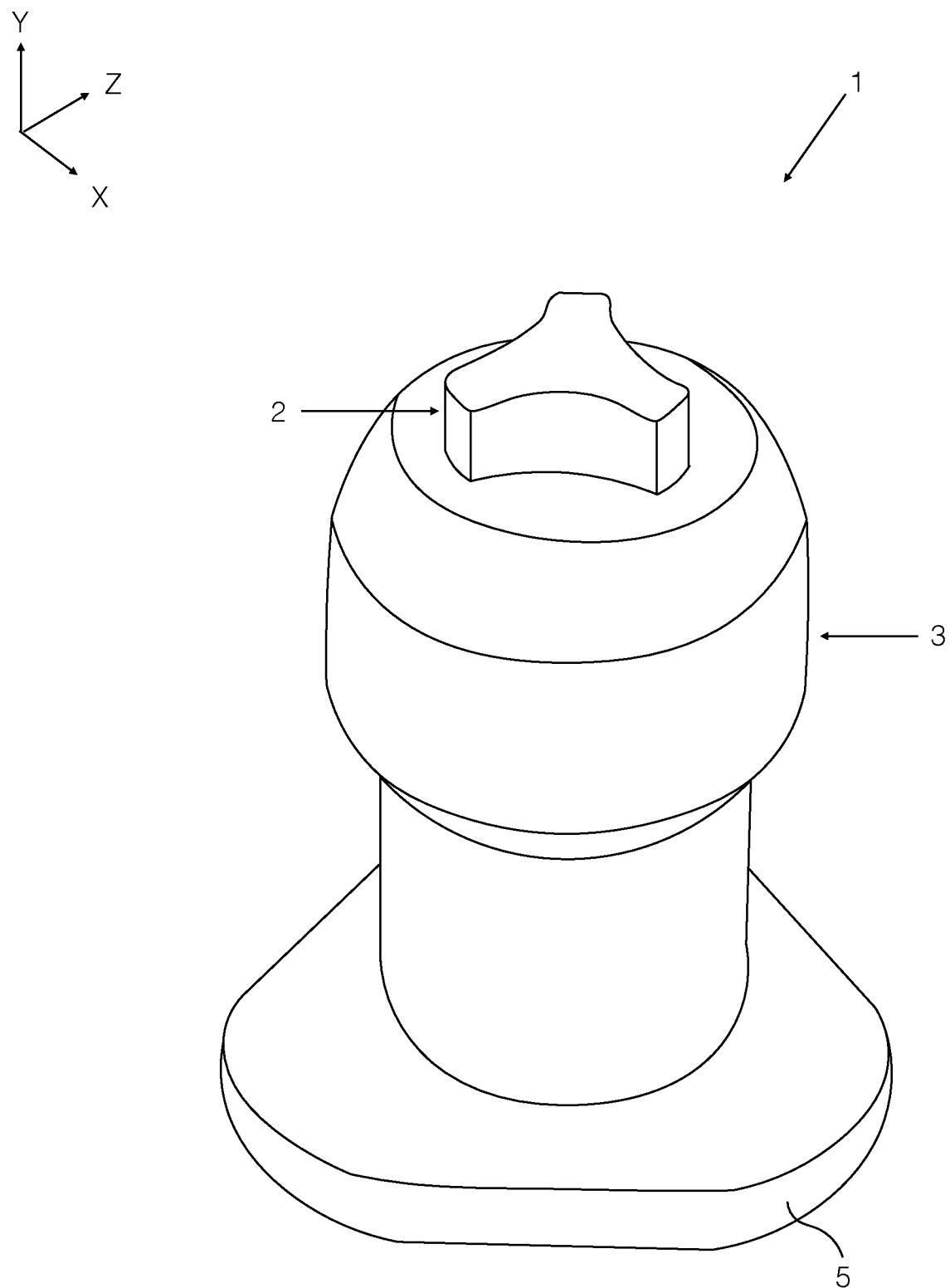
FIG. 1a schematically illustrates, according to an example, a stud according to the disclosed solution, as viewed diagonally from above.

The figures are intended for illustrating the idea of the disclosed solution. Therefore, the figures are not necessarily in scale, or exhaustive in representing the ways in which the disclosed solution may be implemented while adhering to the principles of the disclosed solution.

DETAILED DESCRIPTION OF THE INVENTION

In the text, reference is made to the figures with the following numerals and denotations:
1 Stud
2 Spike
3 Body, of stud
4 Hole
5 Flange
6 Protrusion, of spike
7 Recess, of spike
8 Upper body, of stud
10 Upper surface, of body
11 Lower surface, of body
12 Upper surface, of spike
13 Lower surface, of spike
14 Opening, of hole
15 Floor, of hole
16 Tapering
17 Side wall, of spike
18 Side wall, of hole
20 Friction joint, between spike and body
30 Punch
31 Tip, of punch
h Depth, in hole, from its opening
$h_1$ First depth, in hole, from its opening
$h_2$ Second depth, in hole, from its opening
$h_{max}$ Total depth, of hole
$h_{pen}$ Penetration depth, of spike into hole
X, Y, Z Orthogonal coordinates in the frame of a stud As a terminological note, throughout the text, unless otherwise stated, the cross-sectional shapes of a hole 4 in a stud 1 body 3 and of a spike 2, when described together and especially in comparison, are to be understood with the spike 2 installed in the hole 4 as in a finished stud 1. Furthermore, the cross-sectional shapes of the hole 4 and the spike 2 are described in mutual comparison, unless otherwise stated, so that the compared cross-sectional shapes of the hole 4 and the spike 2 refer the same vertical position, i.e. position along the Y axis, i.e. the vertical position where the side wall 18 of the hole 4 and the side wall 17 of the spike 2 meet at that vertical position. For example, the cross-sectional shapes of the hole 4 and the spike 2 at the opening 14 of the hole 4 refer to those cross-sectional shapes which the hole 4 has at its opening 14 and which the spike 2 has at that vertical position which is located at the opening 14, i.e. where the side wall 17 of the spike 2 meets the opening 14, i.e. meets the side wall 18 of the hole 4 which delimits the opening 14.

As a further terminological note, the notion of "shape" refers, throughout the text, unless otherwise stated, to the geometrical shape of the item under consideration with no regard to its size or surface area. Therefore, two items under consideration may be of similar, or the same, shape while having different sizes or surface areas. For example, the cross-sectional shape of the spike 2 may, according to some examples, remain substantially unchanged, i.e. be the same or substantially the same, through the whole length of the spike 2, i.e. along the Y axis, while the surface area of the cross-sections may vary, for example so that the cross-sectional surface area is greatest at the upper surface 12 of the spike 2 and thereafter it is reduced and is smallest at the lower surface 13 of the spike 2. As another example, the same principles apply to the hole 4 as well.

As yet another terminological note, by two shapes, e.g. cross-sectional shapes, being substantially similar refers to, as a person skilled in the art readily understands in the context, that such shapes are in practical terms similar or the same, but may not for e.g. manufacturing tolerances be geometrically precisely identical. The same principle applies, mutatis mutandis, to two shapes, e.g. cross-sectional shapes, being different from each other.

FIG. 1a illustrates a stainless-steel-bodied stud 1 according to the disclosed solution, according to an example. Such a stud 1 comprises a stainless-steel body 3, i.e. a body 3 made of stainless steel. The feature of the body 3 being made of stainless steel has the advantageous technical effect of reducing or eliminating the corrosion of the body 3, in contrast to conventional steel stud bodies which are prone to corrosion. Such corrosion is detrimental to the technical properties and visual appearance of a studs during both use on roads and during storage, for example during the summer season when studded tires are not in active use but in storage, as noted earlier.

Advantageously, the stud 1 comprises a flange 5 at the bottom end of the body 3. Herein, and subsequently, the notion of "bottom end" of the stud 1 refers to that end of the stud 1 which is opposite to the end of the stud 1 which is intended for road contact. That is, the bottom end of the stud 1 is that end of the stud 1 which is opposite to an opening 14 into which a spike 2 is to be installed.

As is known, the flange 5 improves the staying of the stud 1 in its installation cavity in the tire during the use of the tire. Advantageously, the cross-sectional shape of the flange 5 is non-circular for orienting the stud in its installation cavity, i.e. installation hole, in a tire. For example, the cross-sectional shape of the flange 5 may be triangular with rounded corners. The capability of the stud 1 being orientable with a non-circular flange 5 is particularly beneficial when used in combination with an orientable non-circular spike 2 as elaborated on below. Thereby, in such a case, the orientation of the flange 5 may simultaneously bring about appropriate orientation of the spike 2 as well.

Figure 1B:
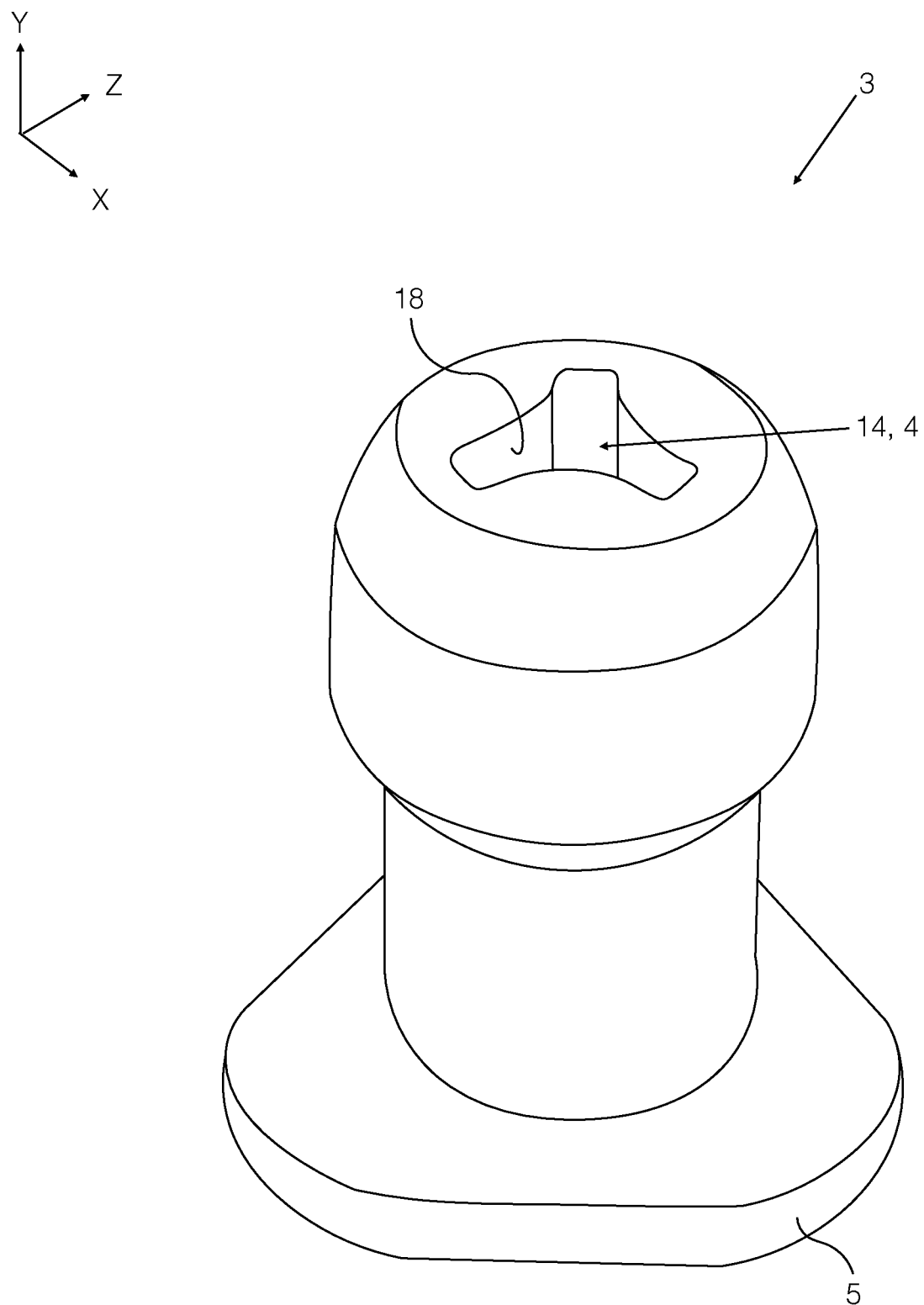
FIG. 1b schematically illustrates, according to an example, a stud body according to the disclosed solution, as viewed diagonally from above.
Figure 2:
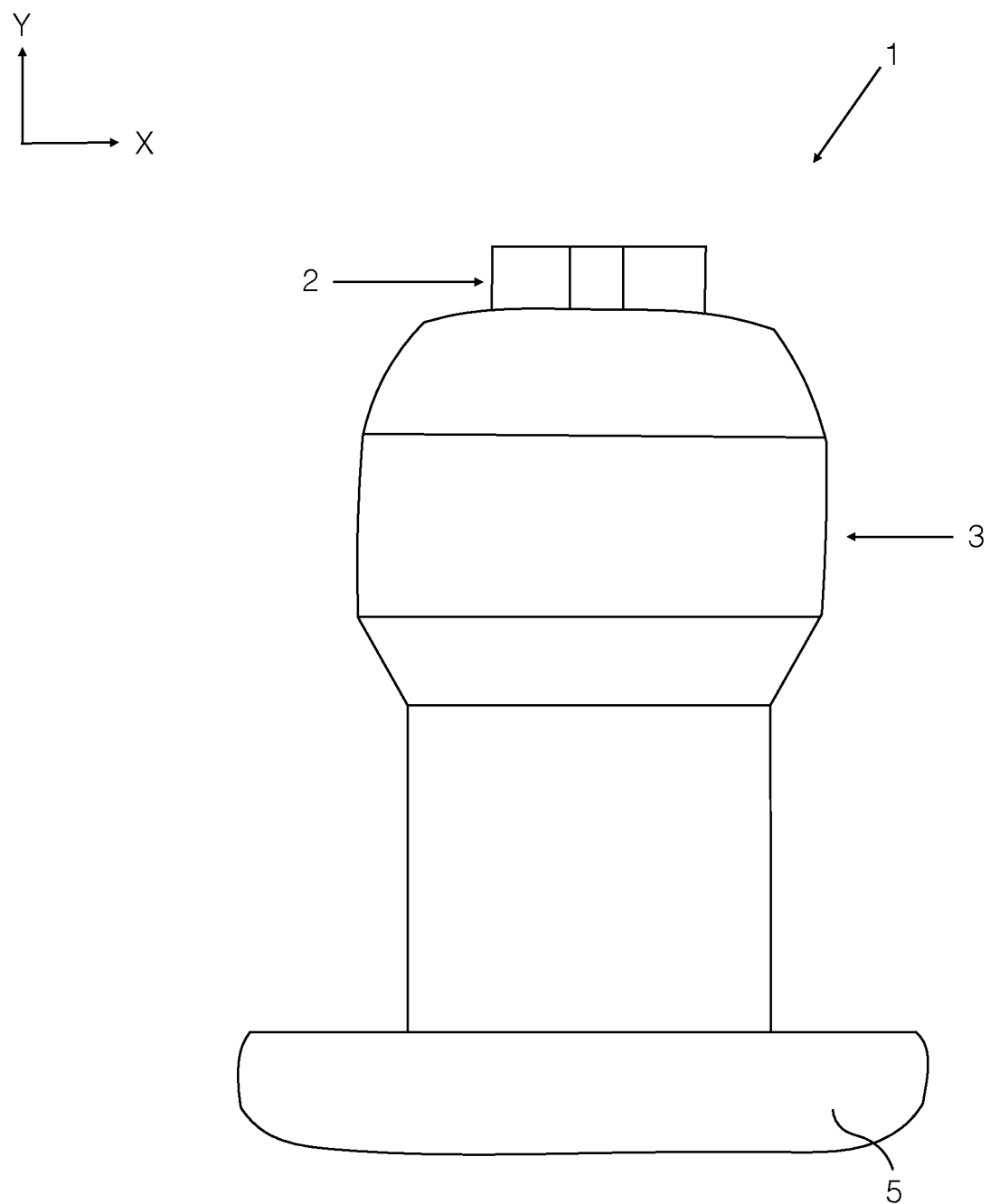
FIG. 2 schematically illustrates the stud of FIG. 1a according to the disclosed solution, as viewed from a side.
Figure 3:
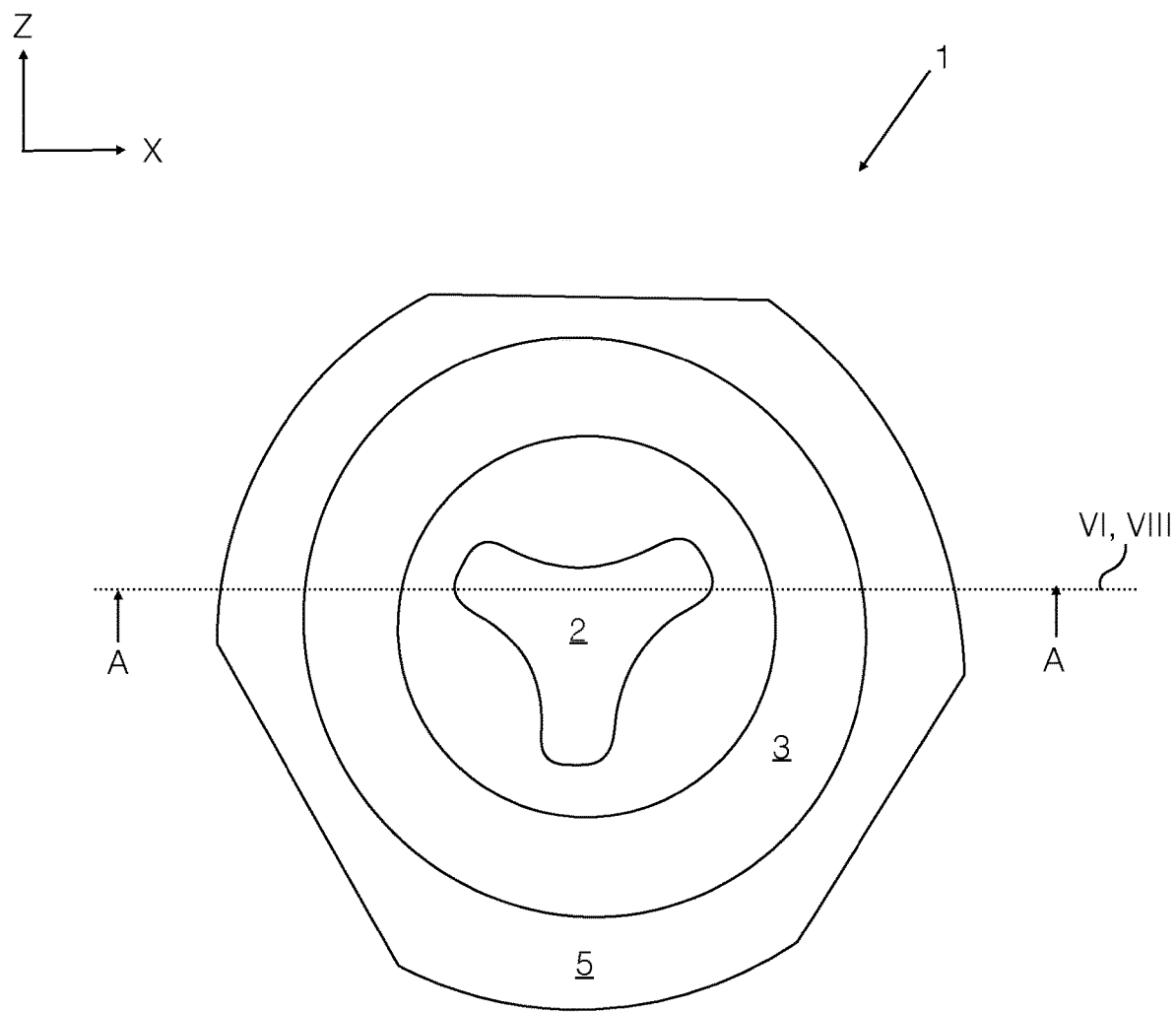
FIG. 3 schematically illustrates the stud of FIG. 1a according to the disclosed solution, as viewed from above.
Figure 4:
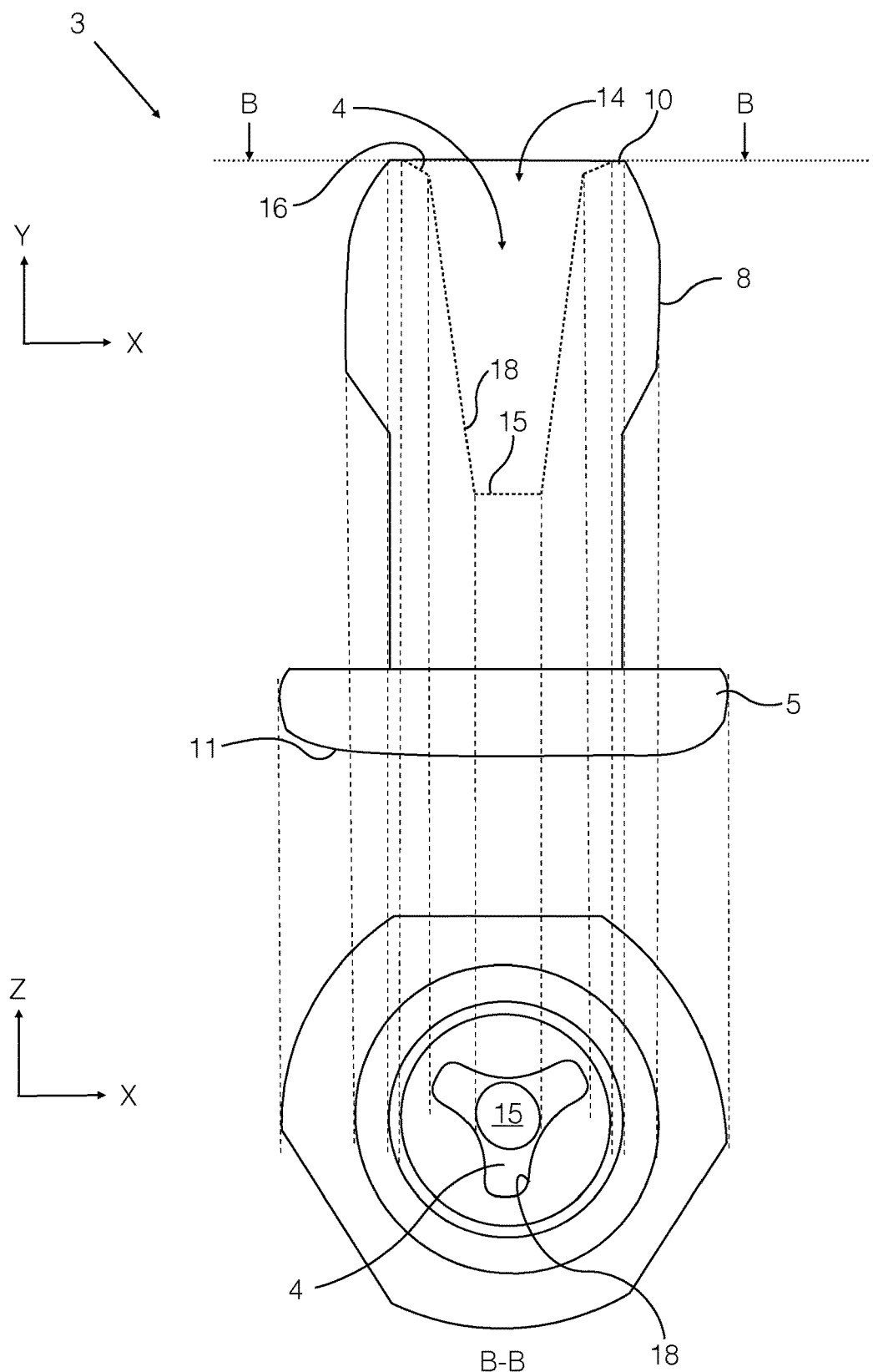
FIG. 4 schematically illustrates a cross section of the body of the stud according to the disclosed solution, without a spike, as viewed from a side, and in a B-B perspective from above.
Figure 12A:
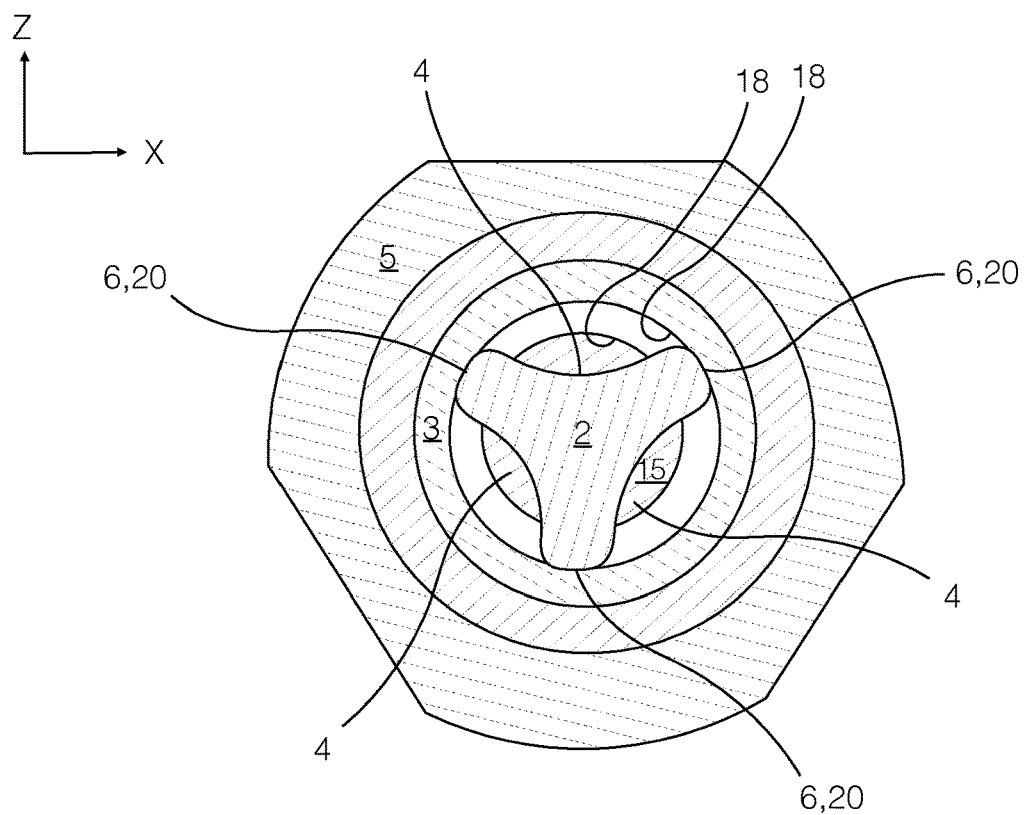
FIG. 12a-12b schematically illustrate, according to yet another alternative example, cross-sections of a stud according to the disclosed solution, with cross-section position correspondence to FIGS. 7a and 7b, respectively.
Figure 12B:
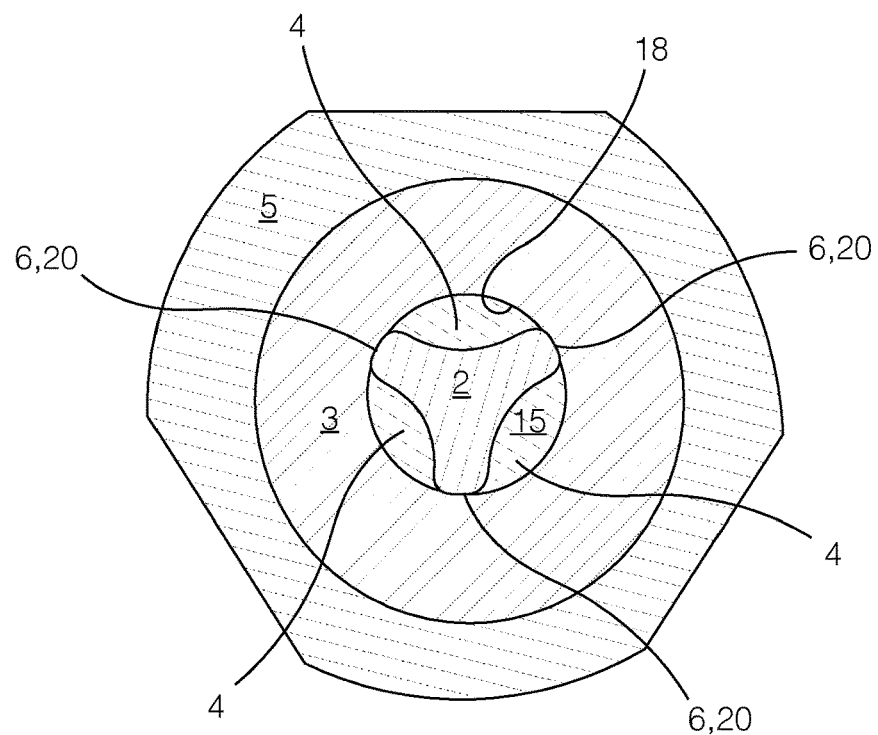

Now referring to FIGS. 1a, 1b and 4, the body 3 of the stud 1 comprises a blind hole 4 extending from an opening 14 at the upper surface 10 of the body 3 towards the lower surface 11 of the body 3. Such an opening 14 may be non-circular as illustrated according to an example in FIG. 1b or it may be circular as illustrated according to an example in FIG. 12a. With reference to FIG. 4, as the blind hole 4 is blind, it terminates with a floor 15 before the lower surface 11 of the body 3. As denoted in FIGS. 1b and 4, the blind hole 4 comprises a side wall 18 delimiting the hole 4 between the floor 15 and the opening 14.

Referring back to FIG. 1a, the stud 1 comprises a spike 2. As is known, such a spike 2 may be made of, for example, hard metal, such as cemented carbide typically comprising tungsten carbide in cobalt matrix. As is known, such a spike 2 may be non-circular in its cross-sectional shape, at least at its upper surface 12, to improve its grip on a driving surface in a certain direction or in certain directions and/or to rotationally orient the spike 2 with respect to the body 3. Furthermore, and as illustrated according to an example in FIG. 1a, such a spike 2 may be non-circular in its cross-sectional shape in that portion of the spike 2 which is at the opening 14 of the hole 4 with respect to the installed position of the spike 2 in the hole 4, as elaborated on below.

With reference to FIGS. 1a and 4 to 6, in the finished stud 1, the spike 2 is installed in the hole 4 such that the lower surface 13 of the spike 2 is directed towards the floor 15 of the hole 4 and such that the upper surface 12 of the spike 2 is directed away from said floor 15. Furthermore, in order for the spike 2 to provide increased traction for the tire on ice in particular, the upper surface 12 of the spike 2 is elevated with respect to the upper surface 10 of the body 3. In other words, the spike 2 protrudes upwards from the upper surface 10 of the body 3, as illustrated according to an example in FIG. 1a.

As a possibility, the body 3 may comprise a tapering 16, i.e. a downward slope, between the upper surface 10 of the body 3 and the opening 14 of the hole 4, as illustrated in FIG. 4. Such a tapering 16 may be beneficial in, for example, guiding the spike 2 into the hole 4 upon installing the spike 2 into the hole 4.

When the stud 1 is manufactured, the spike 2 is inserted into the blind hole 4 in the body 3, whereby fiction joint 20 is formed between the side wall 17 of the spike 2 and the side wall 18 of the hole 4 into which the spike 2 is inserted. Hence, the spike 2 is held in place in the hole 4 with the friction joint 20. When the spike 2 is housed within the hole 4 in its installed position, preferably there remains a gap between the lower surface 13 of the spike 2 and the floor 15 of the hole 4. This is to advantageously enable the spike 2 to withstand impacts by allowing the spike 2 to nudge upon a great impact onto the spike 2 towards the floor 15, thereby reducing the risk of spike 2 damage or breakage.

As stainless steel, in the body 3, is harder and has a higher flow stress than steel, according to the disclosed solution such a friction joint 20 is not to be formed over the entire area of spike 2 wall 17 which resides within the hole 4. This is to reduce the total surface area of the friction joint 20 between the spike 2 and the stud 1 body 3, thereby compensating for the higher hardness and higher flow stress of stainless steel used in the body 3, thereby enabling the spike 2 to withstand impacts by allowing the spike 2 to nudge upon a great impact onto the spike 2 towards the floor 15, thereby reducing the risk of spike 2 damage or breakage when installed in a stainless steel body 3.

To enable using of stainless steel body 3 with corrosion resistance and to retain the possibility for the spike 2 to nudge within the hole 4 of the body 3 for low risk of spike 2 damage or breakage, according to the disclosed solution, the cross-sectional shape of the hole 4 is different from the cross sectional shape of the spike 2 at least one vertical position along the hole-installed depth of the spike 2. That is, according to the disclosed solution, the cross-sectional shape of the hole 4 is different from the cross-sectional shape of the spike 2 at least at one of: the opening 14, the lower surface 13 of the spike 2, and a depth h between the opening 14 and the lower surface 13 of the spike 2; whereby only protrusions 6 of the spike 2 are attached to the side wall 18 of the hole 4 with friction joints 20 where the cross-sectional shape of the hole 4 is different from the cross-sectional shape of the spike 2.

In the case the opening 14 has a non-circular cross-sectional shape, this enables the use of a spike 2 which is correspondingly non-circular in cross-sectional shape at least at the opening 14, as illustrated in FIG. 1a according to an example, whereby the spike 2 becomes rotationally directed by the opening 14 with respect to the body 3. Furthermore, in this case and other cases in which there is correspondence in the cross-sectional shape of the spike 2 at the opening 14 and the cross-sectional shape of the opening 14, such correspondence enables tight circumferential fit between the spike 2 and the opening 14, at the opening 14, as illustrated according to an example in FIG. 7a. In such a case, below the opening 14, there is to be at least one vertical position where there is no circumferential fit between the spike 2 and the opening 14 so as to compensate for the higher strength and flow stress of stainless steel in the body 3. Put differently, and according to an example, at the opening 14 the cross-sectional shape of the opening 14 may be substantially similar to the cross-sectional shape of the spike 2 at the opening 14, whereby the spike 2 may be attached to the side wall 18 of the hole 4 at the opening 14 with a friction joint 20 over substantially the entire circumference of the spike 2; and thereafter towards the floor 15, the cross-sectional shape of the hole 4 may be different from the cross-sectional shape of the spike 2 at least at the lower surface 13 of the spike 2, whereby only protrusions 6 of the spike 2 may be attached to the side wall 18 of the hole 4 with friction joints 20 at least at the lower surface 13 of the spike 2.

Figure 6:
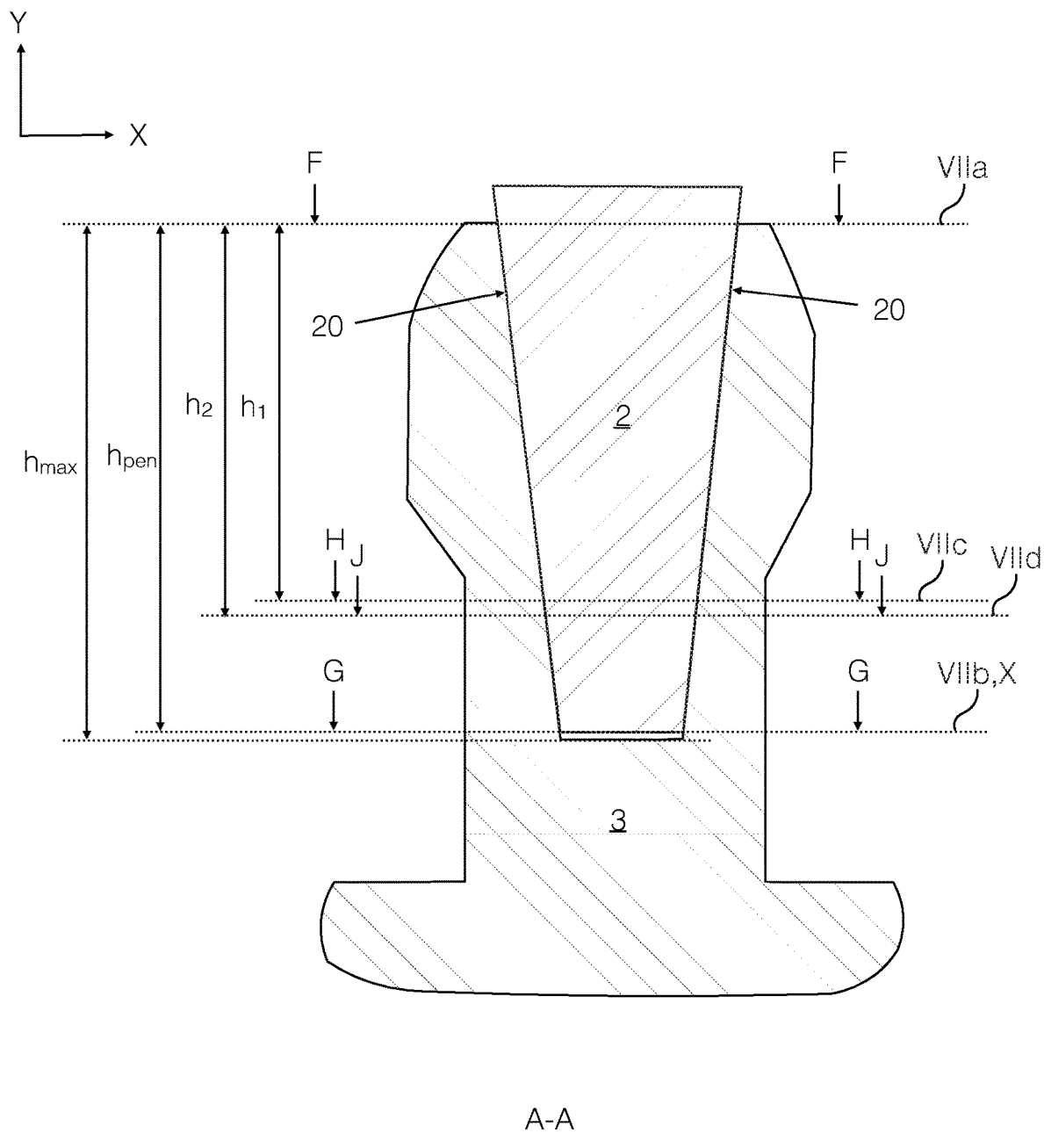
FIG. 6 schematically illustrates the A-A cross section of the stud of FIG. 1a, as denoted in FIG. 3, and as viewed from a side.
Figure 7A:
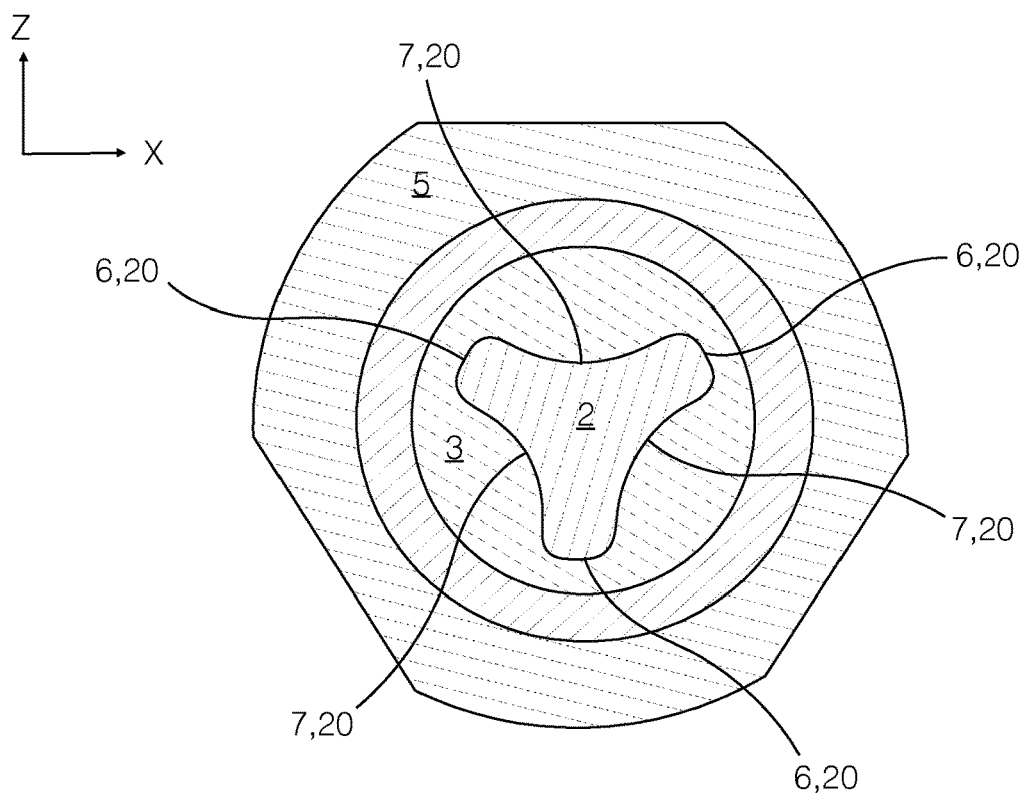
FIGS. 7a-7d schematically illustrate the respective cross-sections F-F, G-G, H-H and J-J of the stud of FIG. 1a, as denoted in FIG. 6, and as viewed from above.
Figure 7B:
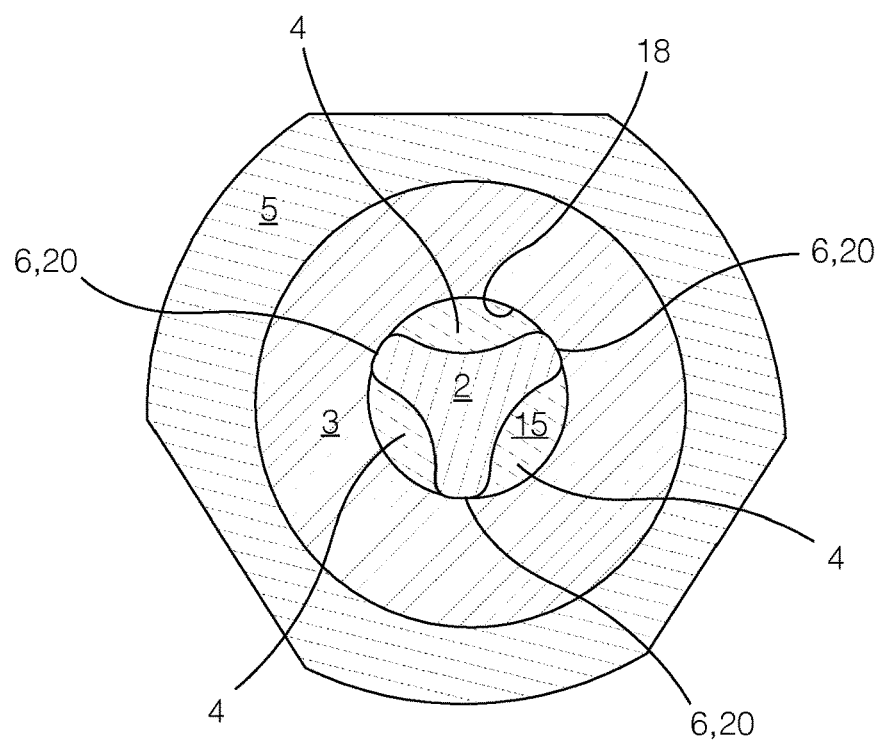
Figure 7C:
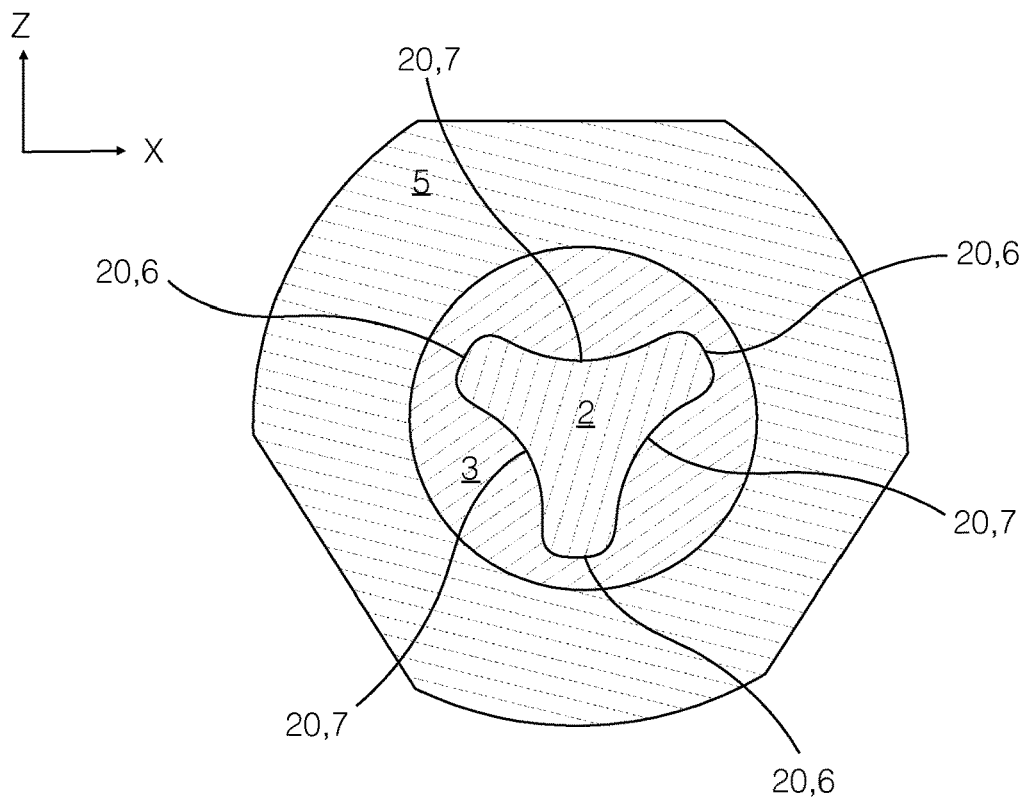
Figure 7D:
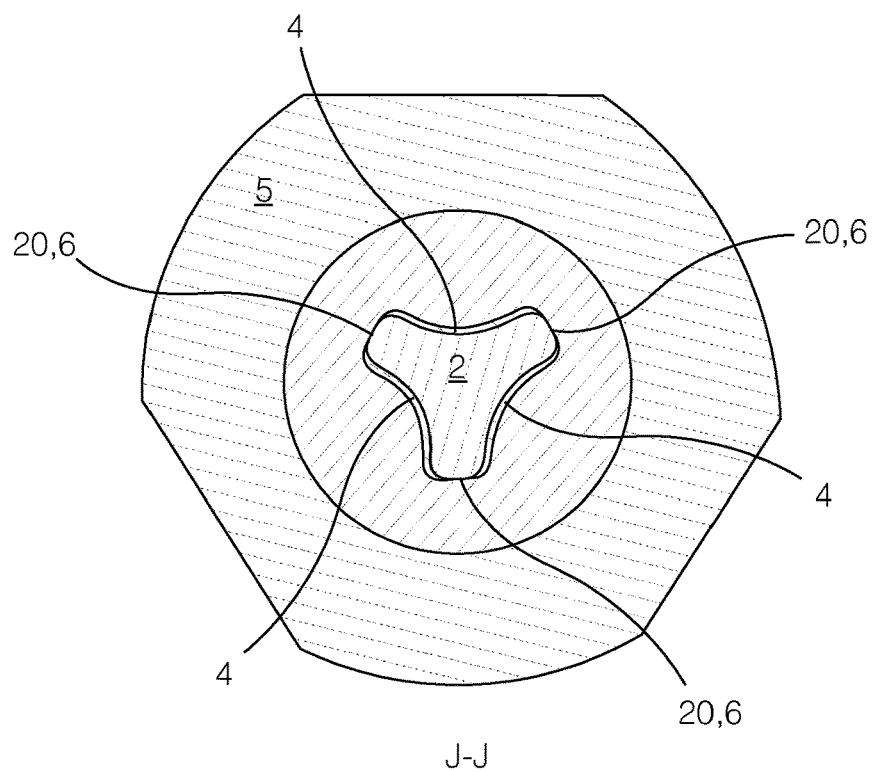

Consequently in such a case, and with reference to FIGS. 6 and 7c to 7d, when the spike 2 is installed in the hole 4, at a first depth $h_1$ there is substantially no free space between the spike 2 and the side wall 18 of the hole 4, as illustrated in FIG. 7c, whereas at a greater second depth $h_2$ there is at some circumferential locations free space between the spike 2 and the side wall 18 of the hole 4, as illustrated in FIG. 7d. That is, from the cross-sectional region of the spike 2 at the opening 14 to the lower surface 13 of the spike 2, there is a transition from substantially complete circumferential fit between the side wall 17 of the spike 2 and the side wall 18 of the hole 4 to a partial circumferential fit between the side wall 17 of the spike 2 and the side wall 18 of the hole 4, as illustrated in FIGS. 7a to 7d.

For example, the cross-sectional shape of the spike 2 may remain substantially unchanged between the upper surface 12 and the lower surface 13 of the spike 2, and the cross-sectional shape of the hole 4 may be substantially similar to the cross-sectional shape of the spike 2 into a depth $h_1$ which is at least 20% but less than 95% of a total depth $h_{max}$ of the hole 4, which depths $h_1$, $h_{max}$ are determined from the opening 14 of the hole 4 towards its floor 15.

That the cross-sectional region of the spike 2 transitions, from at the opening 14 to the lower surface 13 of the spike 2, from substantially complete circumferential fit between the side wall 17 of the spike 2 and the side wall 18 of the hole 4 to partial circumferential fit between the side wall 17 of the spike 2 and the side wall 18 of the hole 4 has the beneficial technical effect of enabling the spike 2 to withstand greater impacts than would be the case if there was substantially complete circumferential fit between the side wall 17 of the spike and the side wall 18 of the hole 4 from at the opening 14 to at the lower surface 13 of the spike 2. That is, if the cross-sectional shape and area of the hole 4 matched the cross-sectional shape and area of the spike 4 at all vertical, i.e. Y axis, positions where the side wall 17 of the spike 2 and the side wall 18 of the hole 4 meet, there would be substantially complete circumferential friction joint 20 throughout the entire penetration depth $h_{pen}$ of the spike 2 into the hole 4. In such a case, if the spike 2 encountered a great impact, for example during the use of the tire having the stud 1 comprising the spike 2, the great extent of the friction joint 20 would not allow the spike 2 to accommodate the impact by nudging towards the floor 15 in the hole 4 in a stainless steel body 3. According to the disclosed solution, in contrast, the feature of there being only partial circumferential fit between the side wall 17 of the spike 2 and the side wall 18 of the hole 4, for example towards and at the lower surface 13 of the spike 2, enables the spike 2 to nudge in the hole 4 due to a lesser extent of the friction joint(s) 20, thereby reducing the risk of spike 2 damage or breakage upon a great impact to the spike 2.

Figure 5:
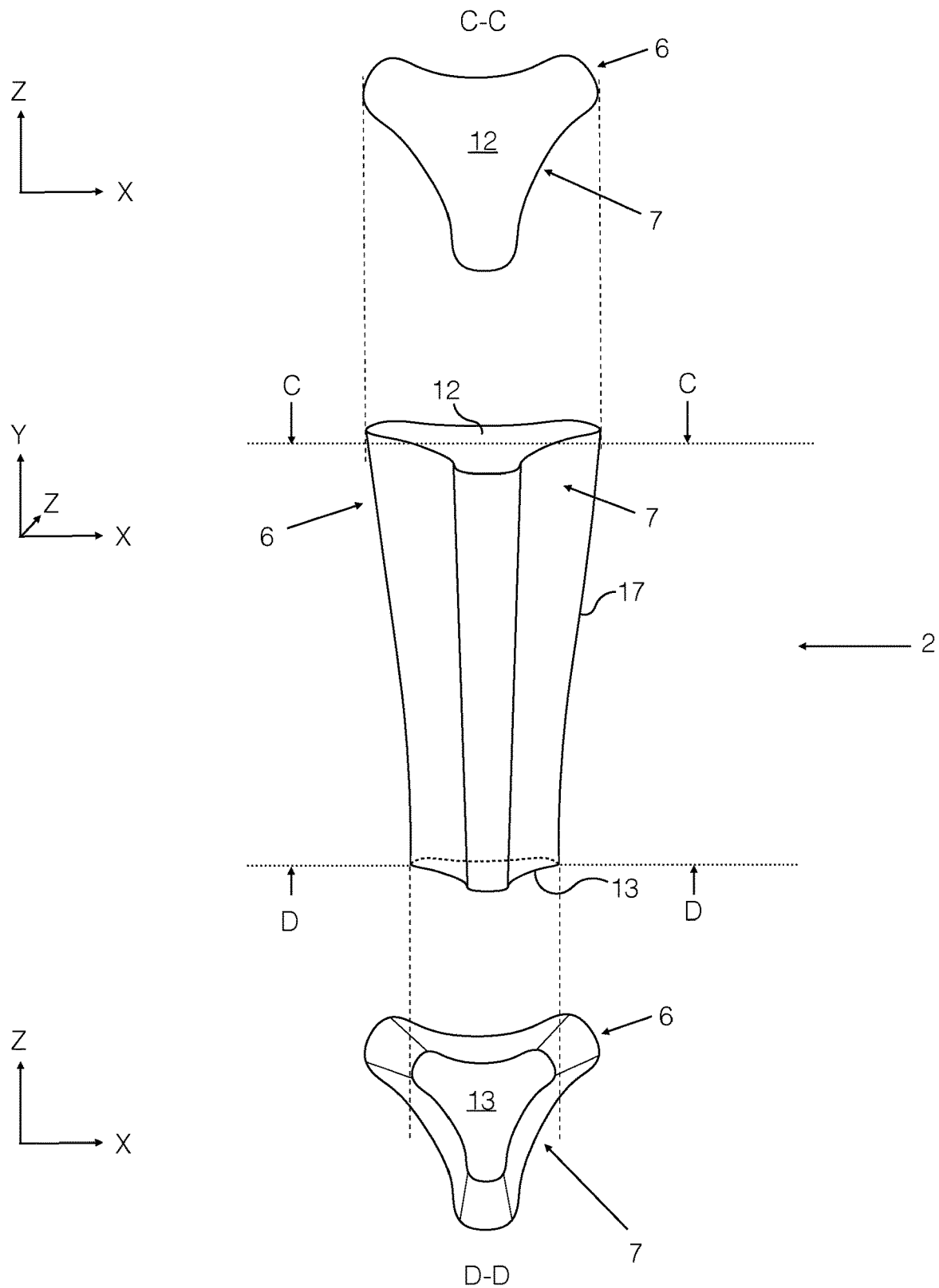
FIG. 5 schematically illustrates the spike of the stud of FIG. 1a as viewed diagonally from above, plus in a C-C perspective from above, plus in a D-D perspective from below.

To install the spike 2 into the hole 4 in such a manner, it is advantageous that the cross-sectional area of the spike 2 decreases from that region of the spike which is contact with the wall 18 of the hole 4 at the opening 14 towards the lower surface 13, as illustrated in FIG. 5, while the cross-sectional area of the hole 4 correspondingly decreases from the opening 14 towards the floor 15, as illustrated in FIG. 4. Furthermore, to allow the insertion of the spike 2 into the hole 4 in the first place, the cross-sectional area of the lower surface 13 of the spike is to be smaller than the cross-sectional area of the opening 14 of the hole 4, so that the opening does not obstruct the travel of the lower surface 13 of the spike 2 into through the opening 14 into the hole 4. Put differently, advantageously the cross-sectional area of the opening 14 of the hole 4 is greater than the cross-sectional area of the floor 15 of the hole 4, the cross-sectional area of the upper surface 12 of the spike 2 is greater than the cross-sectional area of the lower surface 13 of the spike 2, and the cross-sectional area of the opening 14 of the hole 4 is greater than the cross-sectional area of the lower surface 13 of the spike 2.

Advantageously, and with reference to FIG. 6, the hole 4 and the spike 2 are dimensioned in accordance with the above in such a manner that upon installing the spike 2 into the hole 4, a gap remains between the lower surface 13 of the spike 2 and the floor 15 of the hole 4. Put differently, advantageously the penetration depth $h_{pen}$ of the spike 2 into the hole 4 is less than the total depth $h_{max}$ of the hole 4, with both depths $h_{pen}$, $h_{max}$ measured from upper surface 10 of the body 3 towards the lower surface 11 of the body 3. Such a gap prevents the spike 2 from bottoming out, which bottoming out could prevent the above-described friction joints 20 from achieving their intended strength. Such a gap also allows the spike 2 to nudge within the hole 4, as noted above, and prevents the spike 2 from bottoming out during use of the tire having the spike 2, which could result in the friction joints 20 from becoming looser.

For example, the lower surface 13 of the spike 2 may reside at a distance of no more than 2 mm, or no more than 5 mm, from the floor 15, and the cross-sectional shape of the floor 15 may be substantially similar to the cross-sectional shape of the hole 4 at the lower surface 13 of the spike 2. Considering that studs 1 may be manufactured and applied in different sizes, for example for and in passenger car and truck tires, the spike 2 may reside from the floor 15 at a distance of no more than 50%, or no more than 30%, of the total depth $h_{max}$ of the hole 4, and the cross-sectional shape of the floor 15 may be substantially similar to the cross-sectional shape of the hole 4 at the lower surface 13 of the spike 2

As a conceivable alternative to obtaining the same technical effects as with the lower surface 13 of the spike 2 residing at a distance from the floor 15, the hole 4 may extend all the way through the stud 1 body 3, i.e. not only through the upper surface 10 of the body 3, but also through the lower surface 11 of the body 3.

Figure 8A:
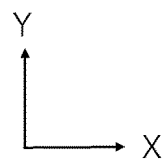
FIGS. 8a-8c schematically illustrate steps of making a blind hole in a stud body with a punch, as viewed from a side and with possible punching supports omitted for illustrative clarity.
Figure 8A:
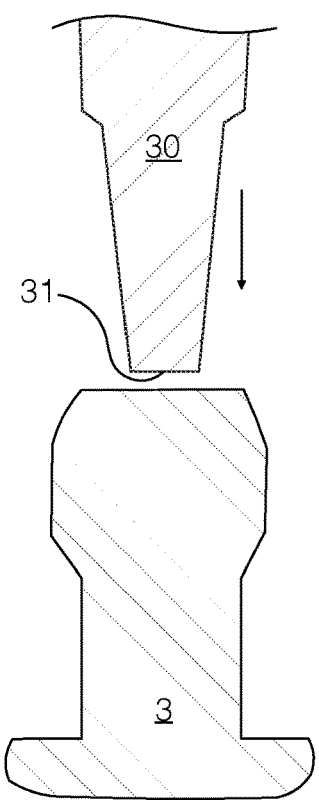
Figure 8B:
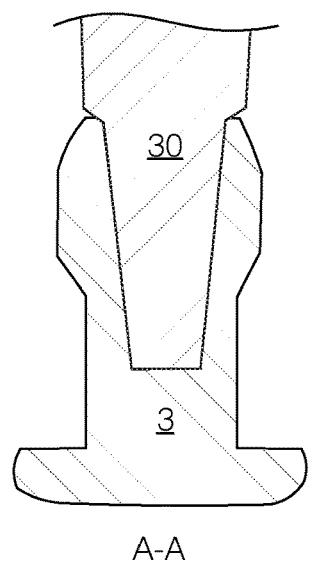
Figure 8C:
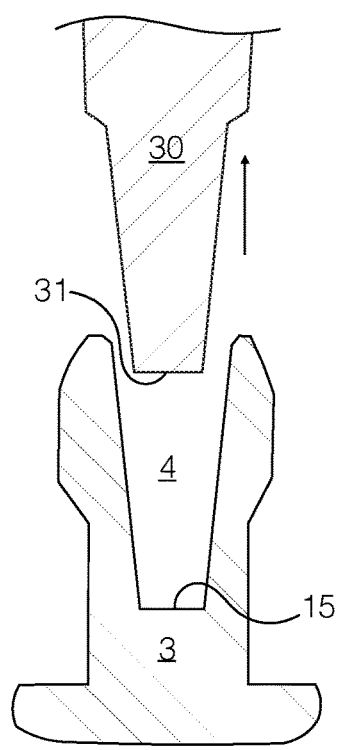

The blind hole 4 is commonly made in the body 3 with a punch 30, as is schematically illustrated in FIGS. 8a to 8c.

In the case of stainless steel, i.e. the body 3 being made of stainless steel, such a punch 30 is subject to significantly greater forces than would be in the conventional case of the body 3 being made of steel. This is because stainless steel has higher hardness and flow stress than steel, whereby stainless steel is less malleable than steel. Especially in the case of cold forging—a common method for manufacturing stud 1 bodies 3 including blind holes 4 for spikes 2—the greater hardness and flow stress of stainless steel, in comparison to steel, subjects tools such as the punch 30 to greater forces. As a result, a punch 30 with a complex tip 31 geometry is in great risk of damage or breakage when used, especially repetitively in serial production, to punch holes 4 in stud bodies 3 for spikes 2. A complex tip 31 geometry for the punch 30 may entail departure from a maximum tip 31 surface area obtainable with a round punch 30 tip 31, for example in the form of inward recess(es). This, in turn, results in smaller cross-sectional area at and near the tip 31 of the punch 30, and consequently weaker punch 30 more prone to breakage and damage when used to punch holes 4 in stainless steel bodies 3 for studs 1.

To reduce the risk of breakage of the punch 30 in the case of a corrosion-resistance stainless steel body 3 while enabling the use of complex, e.g. non-circular, cross-sectional geometry in the spike 2, the hole 4 may a different cross-sectional shape at the floor 15 in comparison to the cross-sectional shape of the opening 14 of the hole. And, as the lower surface 13 of the spike 2 may reside at a small distance from the floor 15, the cross-sectional shape of the hole 4 at the lower surface 13 of the spike 2 may be substantially similar to the cross-sectional shape of the floor 15.

Figure 9A:
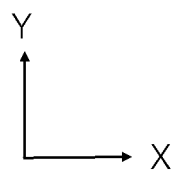
FIG. 9a schematically illustrates a punch for making, in accordance with the disclosed solution, a hole in a stud body for a spike.
Figure 9A:
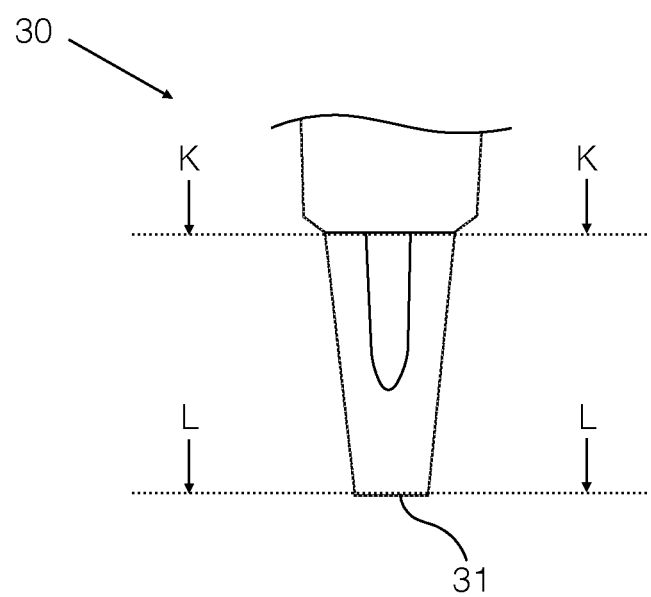
Figure 9B:
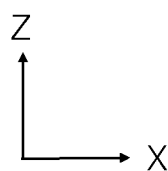
FIGS. 9b-9c schematically illustrate the respective cross-sections K-K and L-L of the punch of FIG. 9a, as viewed from above.
Figure 9B:
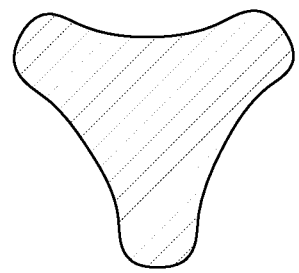
Figure 9C:
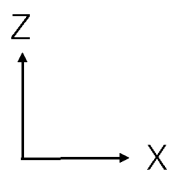
Figure 9C:
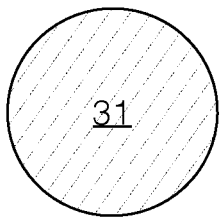

To elaborate, and as illustrated in FIGS. 8a to 8c, the tip 31 of the punch 30 forms the floor 15 of the hole 4 when the punch 30 reaches its maximum penetration into the body 3 upon forming the hole 4. Therefore, the cross-sectional shape of the tip 31 causes the cross-sectional shape of the floor 15. Similarly, the cross-sectional shape of the punch 30 at the opening 14 when the punch 30 reaches its maximum penetration into the body 3 causes the cross-sectional shape of the opening 14. Therefore, the floor 15 and the opening 14 of the hole may be made with mutually different cross-sectional shapes by shaping the punch 30 so that its tip 31 and its opening-forming region have correspondingly mutually different cross-sectional shapes, as illustrated in FIGS. 9a to 9c. Therein, the cross-section K-K refers to the opening-forming region of the punch 30, i.e. that region of the punch 30 which is at the opening 14 when the punch 30 reaches its maximum penetration into the body 3 upon forming the hole 4. Correspondingly, the cross-section L-L refers to the tip 31 of the punch 30.

For example, the cross-sectional shape of tip 31 of the punch 30 and, consequently, the floor 15 of the hole 4 may be circular with the benefit of maximizing the cross-sectional area of punch 30 at and near its tip 31, resulting in increased strength for the punch 30. Such a configuration is illustrated in FIG. 9c for the punch 30 and FIG. 4 for the floor 15. As alternative examples, the cross-sectional shape of the tip 31 of the punch 30 may be hexagonal or octagonal.

According to an example, the cross-sectional shape of both the upper surface 13 and the lower surface 12 of the spike 2 may be three-cusped hypocycloidical with flat-truncated and rounded corners, as illustrated in FIG. 5. That is, the cross-sectional shapes of the upper surface 13 and the lower surface 12 may be similar. Furthermore, the cross-sectional area may decrease from the upper surface 13 towards the lower surface 12 while retaining the shape. As can be discerned from FIG. 5, due to the cross-sectional shape of the spike 2, the side wall 17 of the spike 2 may comprise three protrusions 6 and three recesses 7, which protrusions 6 and recesses 7 may additionally be present in any cross-section of the spike 2 from its upper surface 12 to its lower surface 13.

Such a three-cusped hypocycloidical shape with flat-truncated and rounded corners provides the advantage of enabling a large cross-sectional diameter, i.e. large overall cross-sectional circumference for the spike 2 with a small cross-sectional area and small total volume for the spike 2. In addition, such a three-cusped hypocycloidical shape with flat-truncated and rounded corners enables sufficiently tight friction joint 20 between thusly shaped spike 2 and those cross-sectional positions of the hole 4 which are different in cross-sectional shape from the spike 2, while simultaneously enabling directionable biting into slippery driving surface such as ice.

According to the same example, the cross-sectional shape of the opening 14 may similarly be three-cusped hypocycloidical with flat-truncated and rounded corners, as illustrated in FIG. 1b. Therein, the cross-sectional area of the opening 14 may be greater than the cross-sectional area of the lower surface 12 of the spike 2 having similar shape as the opening 14, for the spike to be installable into the hole 4 through the opening 14.

Still according to the same example, the cross-sectional shape of the floor 15 of the hole 4 may be circular, as illustrated in FIG. 4. Thus, the cross-sectional shape of the hole 14 may transition from three-cusped hypocycloidical with flat-truncated and rounded corners at the opening 14 into circular at and near the floor 15.

Thereby, according to this example, upon installing the spike 2 into the hole 4, friction joints 20 may be formed between the spike 2 and the wall 18 of the hole 4:
at the opening 14, over substantially the entire circumference of the spike 2, as illustrated in FIG. 7a, and
at the lower surface 13 of the spike 2, only between the protrusions 6 of the spike 2 and the wall 18 of the hole 4, as illustrated in FIG. 7b.

As can be readily understood, friction joints 20 may be formed between these two positions in all such loci where the side wall 17 of the spike 2 and the side wall 18 of the hole 4 come into contact upon installing the spike 2 into the hole 4.

Towards this end, and now referring to FIGS. 9a to 9c, the hole 4 may be made with a punch 30 in which the tip 31 is circular and in which its opening-forming region, i.e. that region which forms the cross-sectional shape of the opening 14, is three-cusped hypocycloidical with flat-truncated and rounded corners, as illustrated in FIG. 9c and FIG. 9b, respectively.

Variations to the above example are conceivable while adhering to the general principles of the disclosed solution.

Figure 10A:
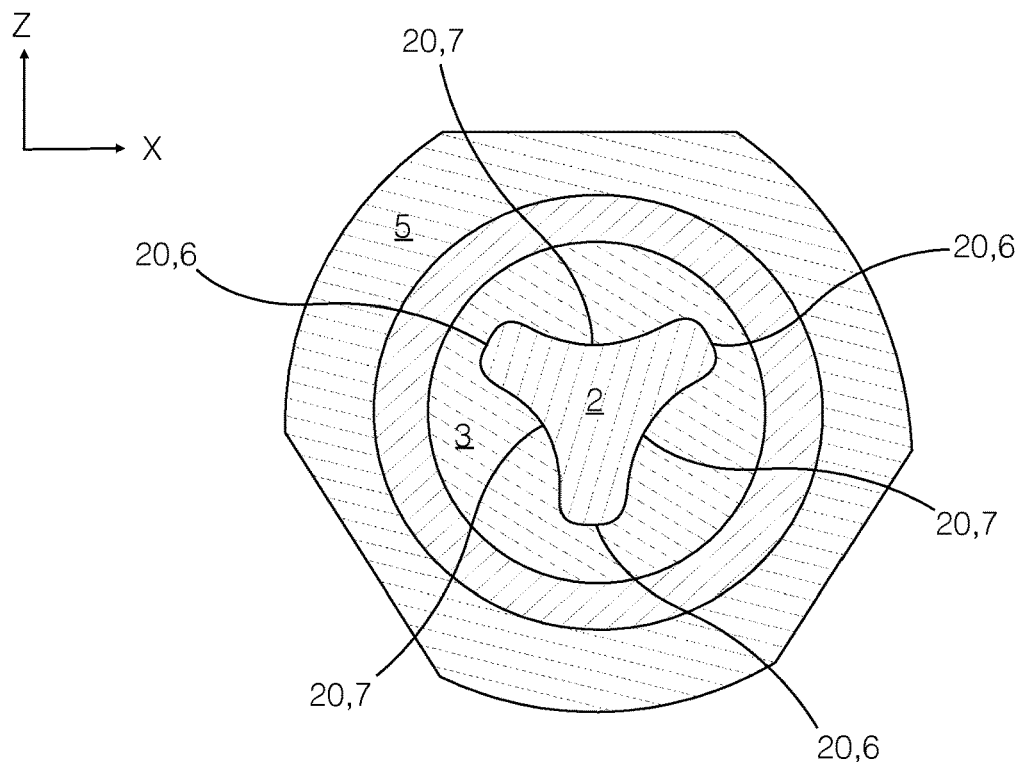
FIG. 10a-10b schematically illustrate, according to an alternative example, cross-sections of a stud according to the disclosed solution, with cross-section position correspondence to FIGS. 7a and 7b, respectively.
Figure 10B:
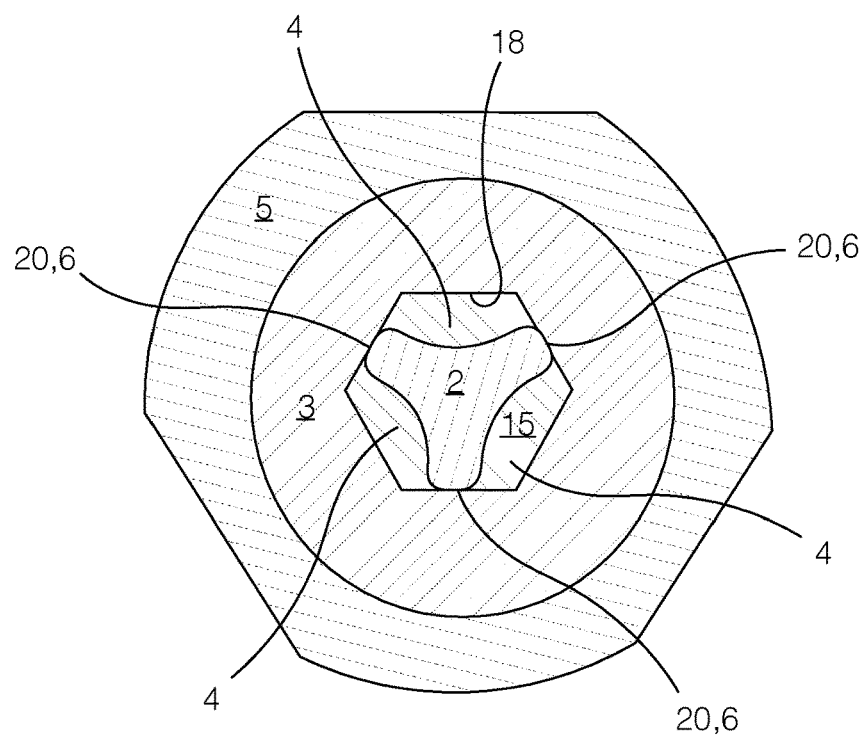

As an example of such a variation, and as illustrated in FIGS. 10a and 10b, illustrating cross-sections of the stud 1 at the opening 14 and at the lower surface 13 of the spike 2, respectively, the spike 2 and the hole 4 may be configured such that:
the cross-sectional shape of the opening 14 and the cross-sectional shape of the spike 2 at the opening 14 both are three-cusped hypocycloidical with flat-truncated and rounded corners, whereby a friction joint 20 is formed between the spike 2 and the wall 18 of the hole 4 at the opening 14 over substantially the entire circumference of the spike 2, and
the cross-sectional shape of the floor 15 is hexagonal and the cross-sectional shape of the lower surface 13 of the spike 2 is three-cusped hypocycloidical with flat-truncated and rounded corners, whereby friction joints 20 are formed at the lower surface 13 of the spike 2 only between the protrusions 6 of the spike 2 and the wall 18 of the hole 4, whereby the tip 31 of the punch 30 to make the hole 4 is hexagonal and larger in cross-sectional area than the lower surface 13 of the spike 3, resulting in stronger and more break-resistant punch 30 for use with stainless steel body 3 forming than would be the case if the tip 31 of the punch 30 would match the cross-sectional shape and area of the lower surface 13 of the spike 2.

Such a hexagonal cross-sectional shape, compared to a circular shape, of the floor 15 and of the hole 4 at the lower surface 13 of the spike 2 may enable a better friction joint 20 between those vertical positions of the spike 2 which have a cross section of a three-cusped hypocycloidical with flat-truncated and rounded corners and those cross-sectional positions of the hole 4 which are hexagonal in cross-sectional shape. In addition, such a hexagonal cross-sectional shape of the floor 15 and of the hole 4 at the lower surface 13 of the spike 2 may be easier to transition into from the above-mentioned cross-sectional shape of the opening 14 when making the hole 4.

Figure 11A:
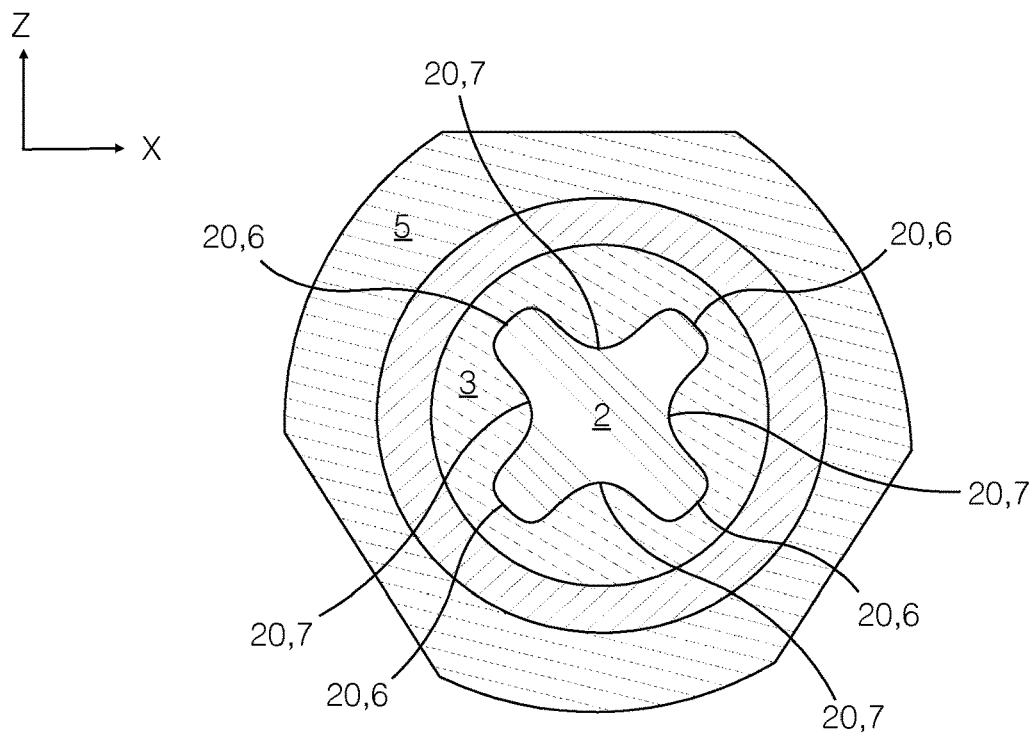
FIG. 11a-11b schematically illustrate, according to another alternative example, cross-sections of a stud according to the disclosed solution, with cross-section position correspondence to FIGS. 7a and 7b, respectively.
Figure 11B:
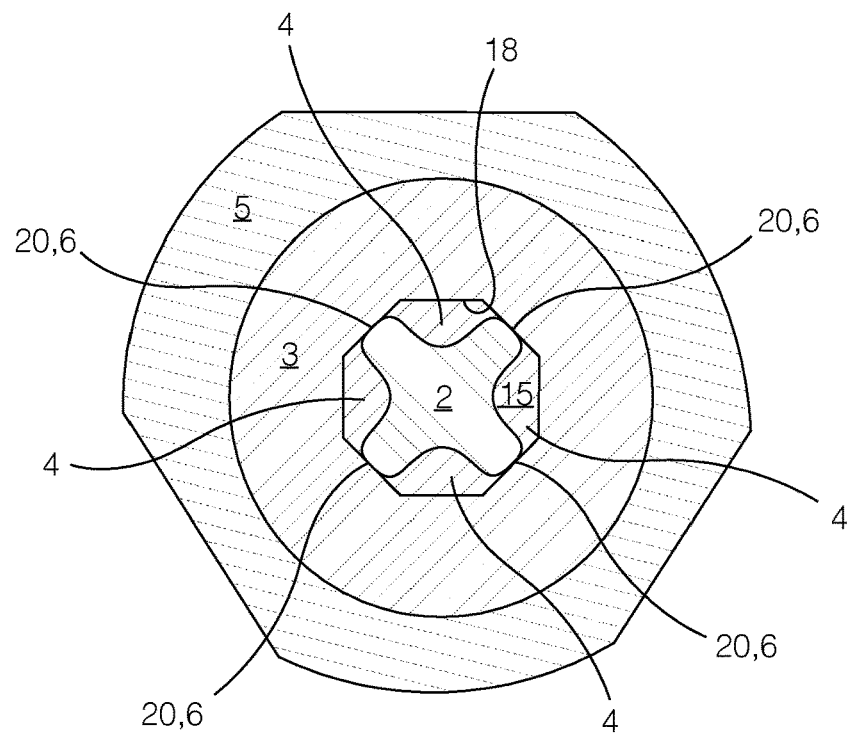

As another example of such a variation, and as illustrated in FIGS. 11a and 11b, illustrating cross-sections of the stud 1 at the opening 14 and at the lower surface 13 of the spike 2, respectively, the spike 2 and the hole 4 may be configured such that:

the cross-sectional shape of the opening 14 and the cross-sectional shape of the spike 2 at the opening 14 both are four-cusped hypocycloidical with flat-truncated and rounded corners, whereby a friction joint 20 is formed between the spike 2 and the wall 18 of the hole 4 at the opening 14 over substantially the entire circumference of the spike 2, and the cross-sectional shape of the floor 15 is octagonal and the cross-sectional shape of the lower surface 13 of the spike 2 is four-cusped hypocycloidical with flat-truncated and rounded corners, whereby friction joints 20 are formed at the lower surface 13 of the spike 2 only between the protrusions 6 of the spike 2 and the wall 18 of the hole 4, whereby the tip 31 of the punch 30 to make the hole 4 is octagonal and larger in cross-sectional area than the lower surface 13 of the spike 3, resulting in stronger and more break-resistant punch 30 for use with stainless steel body 3 forming than would be the case if the tip 31 of the punch 30 would match the cross-sectional shape and area of the lower surface 13 of the spike 2.

Such an octagonal cross-sectional shape, compared to a circular shape, of the floor 15 and of the hole 4 at the lower surface 13 of the spike 2 may enable a better friction joint 20 between those vertical positions of the spike 2 which have a cross section of a four-cusped hypocycloidical with flat-truncated and rounded corners and those cross-sectional positions of the hole 4 which are octagonal in cross-sectional shape. In addition, such a octagonal cross-sectional shape of the floor 15 and of the hole 4 at the lower surface 13 of the spike 2 may be easier to transition into from the above-mentioned cross-sectional shape of the opening 14 when making the hole 4.

Thus, the cross-sectional shape of the spike 2 at the opening 14 may be, for example, three- or four-cusped hypocycloidical with flat-truncated and rounded corners.

The examples described throughout the text are intended to explain the general idea of the disclosed solution. Therefore, such examples are not to be taken as exhausting the ways in which the general idea of the disclosed solution may be implemented.

The invention claimed is:

1. A tire stud comprising:
 a stainless-steel body comprising:
  a flange at a bottom end of the body, wherein the cross-sectional shape of the flange is non-circular for orientating a stud in an installation hole in a tire, and
  a blind hole extending from an opening at an upper surface of the body towards a lower surface of the body and terminating with a floor; and
 a spike which is installed in said hole such that:
  a lower surface of the spike is directed towards said floor, and
  an upper surface of the spike is directed away from said floor and is elevated with respect to the upper surface of the body,
 wherein:
  the cross-sectional shape of the hole is different from the cross-sectional shape of the spike at least at one of:
   the opening,
   the lower surface of the spike, and
   a depth between the opening and the lower surface of the spike,
  whereby only protrusions of the spike are attached to a side wall of the hole with friction joints where the cross-sectional shape of the hole is different from the cross-sectional shape of the spike; and
 wherein:
  at the opening, the cross-sectional shape of the opening is substantially similar to the cross-sectional shape of the spike at the opening, whereby the spike is attached to the side wall of the hole at the opening with a friction joint over substantially an entire circumference of the spike, and
  towards the floor, the cross-sectional shape of the hole is different from the cross-sectional shape of the spike at least at the lower surface of the spike, whereby only protrusions of the spike are attached to the side wall of the hole with friction joints at least at the lower surface of the spike.

2. The stud according to claim 1, wherein the opening of the hole is non-circular.

3. The tire stud according to claim 1, wherein
 the cross-sectional area of the opening of the hole is greater than the cross-sectional area of the floor of the hole,
 the cross-sectional area of the upper surface of the spike is greater than the cross-sectional area of the lower surface of the spike, and
 the cross-sectional area of the opening of the hole is greater than the cross-sectional area of the lower surface of the spike.

4. The stud according to claim 1, wherein
 the lower surface of the spike resides from the floor at a distance of no more than 50% of the total depth of the hole, and
 the cross-sectional shape of the floor is substantially similar to the cross-sectional shape of the hole at the lower surface of the spike.

5. The tire stud according to claim 1, wherein the cross-sectional shape of the hole at the lower surface of the spike is circular, hexagonal or octagonal.

6. The tire stud according to claim 1, wherein the cross-sectional shape of the spike at the opening is three- or four-cusped hypocycloidical with flat-truncated and rounded corners.

7. The tire stud according to claim 1, wherein the cross-sectional shape of the spike remains substantially unchanged between the upper surface and the lower surface of the spike, and the cross-sectional shape of the hole is substantially similar to the cross-sectional shape of the spike into a depth which is at least 20% but less than 95% of a total depth of the hole, which depths are determined from the opening of the hole towards its the floor.

8. The stud according to claim 1, wherein
the lower surface of the spike resides from the floor at a distance of no more than 30% of a total depth of the hole, and
the cross-sectional shape of the floor is substantially similar to the cross-sectional shape of the hole at the lower surface of the spike.

\* \* \* \* \*